(12) United States Patent
Engle

(10) Patent No.: US 6,705,478 B1
(45) Date of Patent: Mar. 16, 2004

(54) INTEGRATED ELECTRICAL/AIR CONNECTOR

(75) Inventor: Thomas L. Engle, Clayton, NY (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/698,570

(22) Filed: Oct. 27, 2000

Related U.S. Application Data

(60) Provisional application No. 60/162,173, filed on Oct. 28, 1999.

(51) Int. Cl.[7] .................................................. B61G 5/08
(52) U.S. Cl. ........................ 213/1.3; 213/76; 439/195
(58) Field of Search ................ 213/1.3, 76; 439/34, 439/195, 288; 303/15

(56) References Cited

U.S. PATENT DOCUMENTS

| | | | | |
|---|---|---|---|---|
| 1,784,326 A | * | 12/1930 | Alder ........................ | 439/195 |
| 1,880,957 A | * | 10/1932 | Farmer ...................... | 439/195 |
| 3,523,266 A | * | 8/1970 | Wetzig et al. ................ | 303/15 |
| 3,895,850 A | | 7/1975 | Engle et al. | |
| 4,183,599 A | * | 1/1980 | Wetzig ........................ | 303/15 |
| 5,449,295 A | | 9/1995 | Hanano et al. | |
| 5,586,668 A | * | 12/1996 | Miller ........................ | 213/1.3 |
| 5,658,159 A | * | 8/1997 | Gardner et al. .............. | 213/1.3 |
| 5,833,482 A | * | 11/1998 | Buchter ...................... | 439/288 |
| 5,865,329 A | * | 2/1999 | Gay et al. .................... | 213/1.3 |

\* cited by examiner

*Primary Examiner*—S. Joseph Morano
*Assistant Examiner*—Lars A. Olson
(74) *Attorney, Agent, or Firm*—Buchanan Ingersoll, P.C.

(57) ABSTRACT

An integrated electrical and pneumatic train line connector is provided. In a typically glad hand connector for connecting the pneumatic lines on either end of a train car, each glad hand also includes an integrated electrical connector for the train electrical line which runs along the length of the train. Each glad hand comprises an inner and outer face to which are connected respective male and female connectors for the electrical train line. The male contact is preferably provided on the lower portion of the glad hand and a correspondingly figured female connector is provided on the upper portion of the glad hand. When a glad hand from one railcar is attached to the glad hand of a second railcar the cooperating male and female connectors of each of glad hands are automatically connected as the pneumatic line is connected. One step electrical and pneumatic coupling is therefore provided for railroad cars.

2 Claims, 5 Drawing Sheets

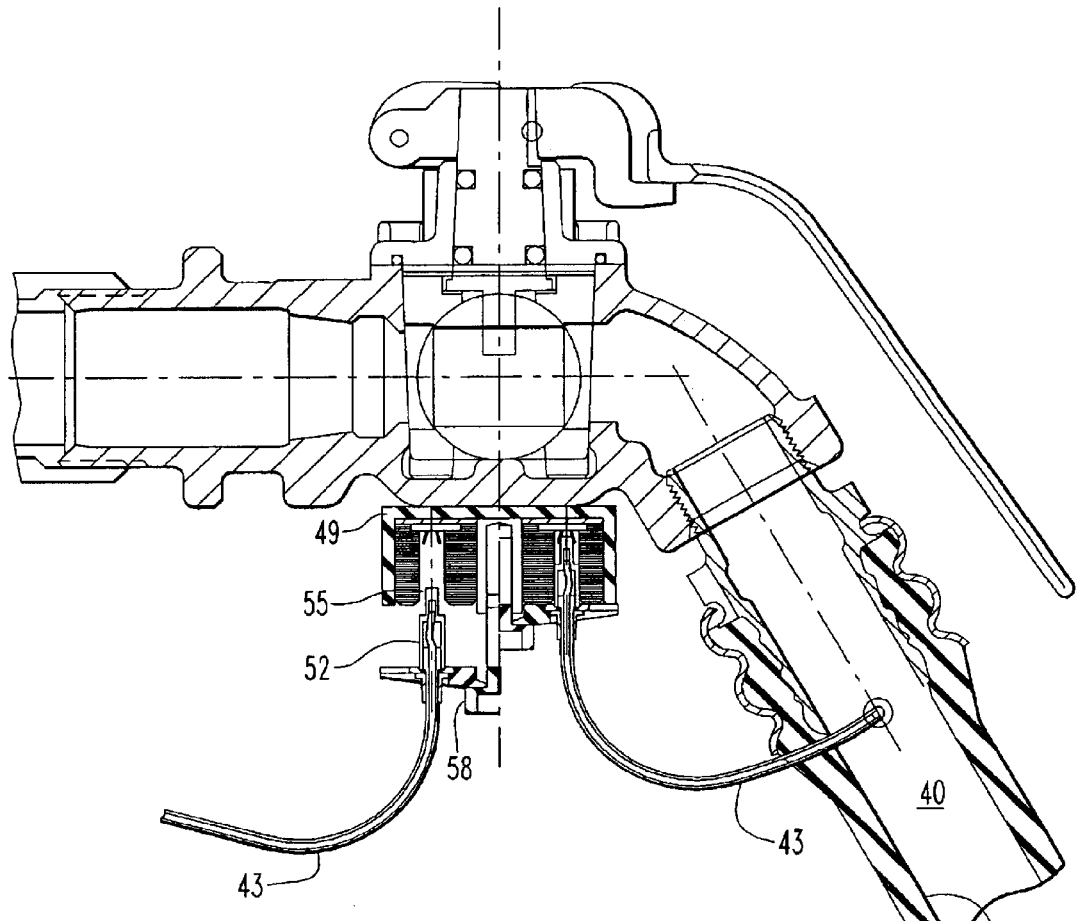
FIG. 5
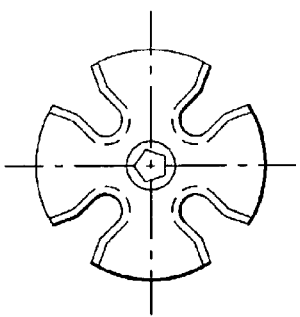

INTEGRATED ELECTRICAL/AIR CONNECTOR

RELATED APPLICATION

This application is related to provisional application Ser. No. 60/162,173, filed Oct. 28, 1999.

BACKGROUND OF THE INVENTION

1. Field of the Invention

The invention relates to electropneumatic braking systems for railroad cars, to remote multiple unit control of locomotives, and to remote sensing of journal bearing conditions, and more particularly to a combined electrical and pneumatic train line connector.

2. Description of the Prior Art

In conventional electropneumatic brake systems for railroad cars, an electrical line is connected along the length of the train in parallel with the pneumatic line supplying pressurized air to the air brake system. Generally, this necessitates two separate connections when connecting individual railroad cars in order to make up the complete train, the pneumatic connection and the electrical connection. Since only a single point of connection is desired for each system and since the cars may be turned end-for-end in any order, it is preferred that the single point of connection be on the center line of the car. Thus, the two systems should be located one above the other on the center line or, more precisely in the vertical center plane of the cars. This necessitates the railroad operating person, an engineer or brakeman, for example, completing two control system connections for each mechanical car connection. In conventional systems, this can be time consuming and problematic in that after the pneumatic connection is made, the trainman must first couple the air hoses in the usual way then reach over and/or under those coupled hoses to complete the electrical connection. This second operation can be made more difficult by the fact that the available space for joining the electrical connectors is already occupied by a pair of hose couplings, which requires the electric lines to be shorter than the air hoses such that the electric coupler can be positioned above them. This shorter connection is more difficult to complete than would be the case otherwise. Occasionally in making up transfer runs for railroad cars or preparing blocks of cars for operation in other trains where the electropneumatic system will not be used, the person working in the train yard and making up these couplings of cars will not couple the electrical cables at that time. Further, if electrical cables are not connected, the loose ends are more subject to direct corrosion and damage than if connected. It is also much easier to introduce a second control line through the train if no thought or change to existing car coupling/uncoupling procedures is required to assure its proper connection.

It is therefore more desirable to provide an electrical connection which can be made simultaneously with the pneumatic connection to eliminate the double work and the delay in making two separate connections typically required. It is further desirable that the trainman's actions in connecting a pair of these combination air-electric couplings be identical with those required when existing air-only hose couplings are connected. Further it is most preferred that a combination coupling according to this invention be capable of coupling with an air-only coupling, again with no requirement for additional attention on the part of the trainman. As stated above, when cars equipped with an electropneumatic brake control system and separate electric pneumatic connectors are brought into an initial terminal yard in blocks, it can be completed in such a way that the electrical lines are not connected even though the pneumatic lines have been. When a train made up from such blocks is to be dispatched, additional personnel must walk along the length of the train to double check and ensure that all electrical lines have been connected prior to testing the train, which would otherwise be ready for testing at once. If the second electrical connection is made automatically with the pneumatic connection, such trains could be immediately inspected and train yard operations more efficiently performed. In existing trainyard operations, if a hose assembly (the car to car coupling—the hose—and the nipple which screws into a car mounted fitting) leaks, has a defective coupling or otherwise is found incapable of rendering proper operations, it is simply replaced. The entire assembly is then sent to a repair shop where it is inspected, defective components replaced, and returned to the railroad ready for re-use. The present invention would maintain this philosophy by molding the conductors of the electric system into the hose (on the neutral bend axis of the hose) and attaching the electric connectors to a modified hose coupling while providing on the molded conductor's nipple end a plug suitable for quick connection to the car's electric lines. The device changed in the trainyard when either air or electrical failures were noted, would be the same as at present, the hose assembly.

It is therefore an object of the present invention to provide a combined electric and pneumatic train line connector which allows for a one step connection of both of these systems.

It is a further object of the present invention to assure that blocks of coupled cars will have electrical lines connected whether required or not at the time of initial car coupling, while improving the reliability of the electrical connection so made.

It is a further object to provide a hose assembly whose replacement will renew all electric and pneumatic coupling parts with as little change as possible in present maintenance practice.

SUMMARY OF THE INVENTION

An electropneumatic train line connector for connecting a train pneumatic brake pipe and an electrical line comprising a hose assembly consisting of a hose coupling including electrical contacts, a hose having conducting wires molded into its cover connected to the electrical connector parts, a nipple for connecting the hose assembly to an angle cock or other car mounted pneumatic fitting and a plug on the wires at the nipple end of the assembly suitable for connecting the wires in the hose assembly to wires mounted on the car and terminated in a receptacle which will receive the plug. Each end of the brake pipe has a similar angle cock for each end of the rail vehicle. The pneumatic coupling part of the hose assembly further includes an inner face and an outer face wherein a first electrical connector is mounted on the inner face and a second electrical connector is mounted on the outer face. The first electrical connector (the fork) further comprises an electrically conductive blade and the second electrical connector further comprises at least one electrically conductive contact means, such as a pair of spring loaded contacts. The electrically conductive blade of a first coupling mates with the second (fork) to complete a first electrical connection with the electrically conductive contact means of a second hose coupling and the electrically conductive blade of the second hose coupling completes a second electrical connection with the electrically conductive (fork) contact means of the first hose coupling when the pneumatic connection is completed. Thus, the pneumatic and electrical connections are generally made simultaneously in one operation.

BRIEF DESCRIPTION OF THE DRAWINGS

FIG. 5 shows one embodiment of an electrical junction box for a railroad car angle cock according to the present invention.

DETAILED DESCRIPTION OF THE PREFERRED EMBODIMENTS

Figure 1A:
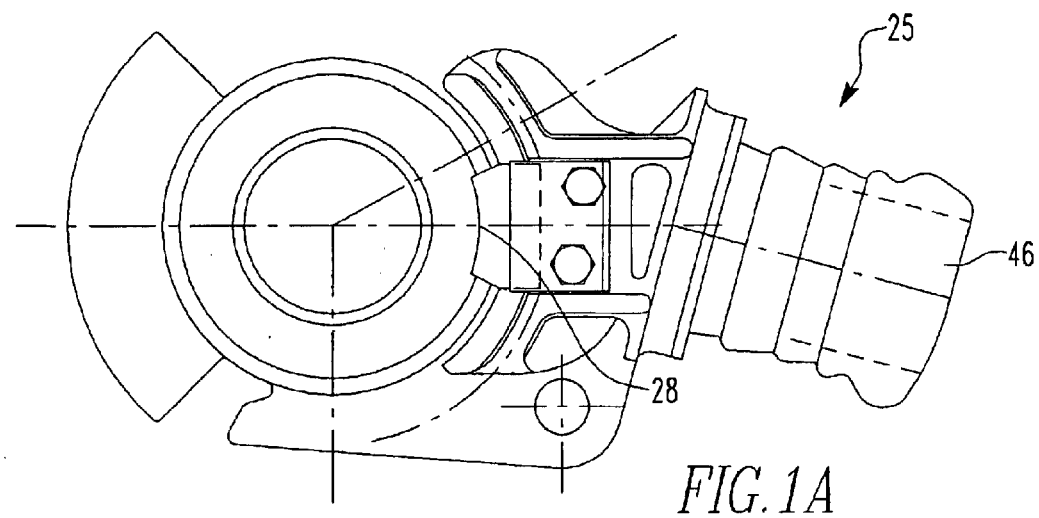
FIG. 1, consisting of Figures 1A, 1B and 1C, show a top view, side view and bottom view, respectively, of a combined air and electrical connector according to the present invention.
Figure 1B:
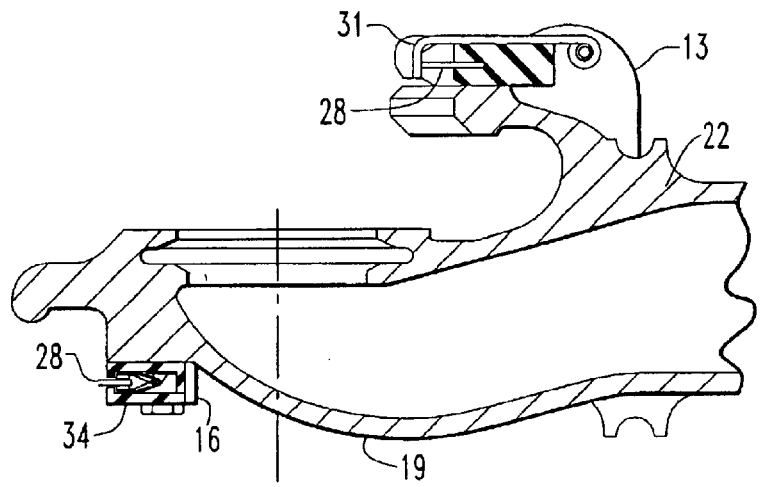
Figure 1C:
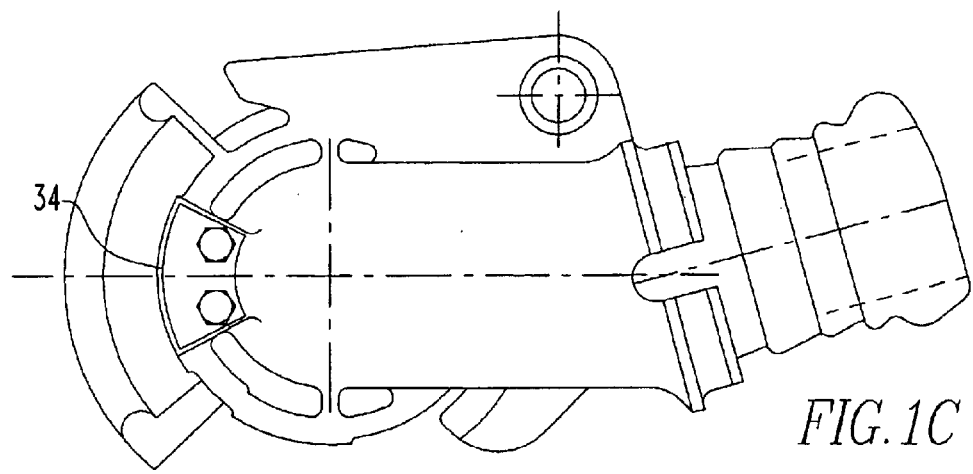

Referring now to the drawings in detail, there is shown in FIG. 1 an embodiment of the integrated electrical/air connector 10 of the present invention which comprises two molded contact assemblies 13, 16 attached to the outer 19 and inner 22 faces, respectively, of a modified conventional hose coupling 25. As shown in FIG. 1 incorporated into the pneumatic coupling or gladhand 25, the inner face 22 or "bottom" connection comprises a simple blade 28, protected from human contact by a movable safety cover 31. The outer face 19 or "top" connection is a molded block containing within itself at least one, and preferably eight, pairs of spring loaded, opposed contacts 34 (See FIG. 3) movable apart from one another but otherwise firmly positioned such that when a blade 28 is inserted between them, the spring 37 will yield and permit the insertion of a blade in order to make the electrical connection, but will maintain normal force between the blade 28 and contact 34. The blade is thus firmly clamped between these contacts 34, providing multiple secure, low resistance electrical paths.

Figure 2:
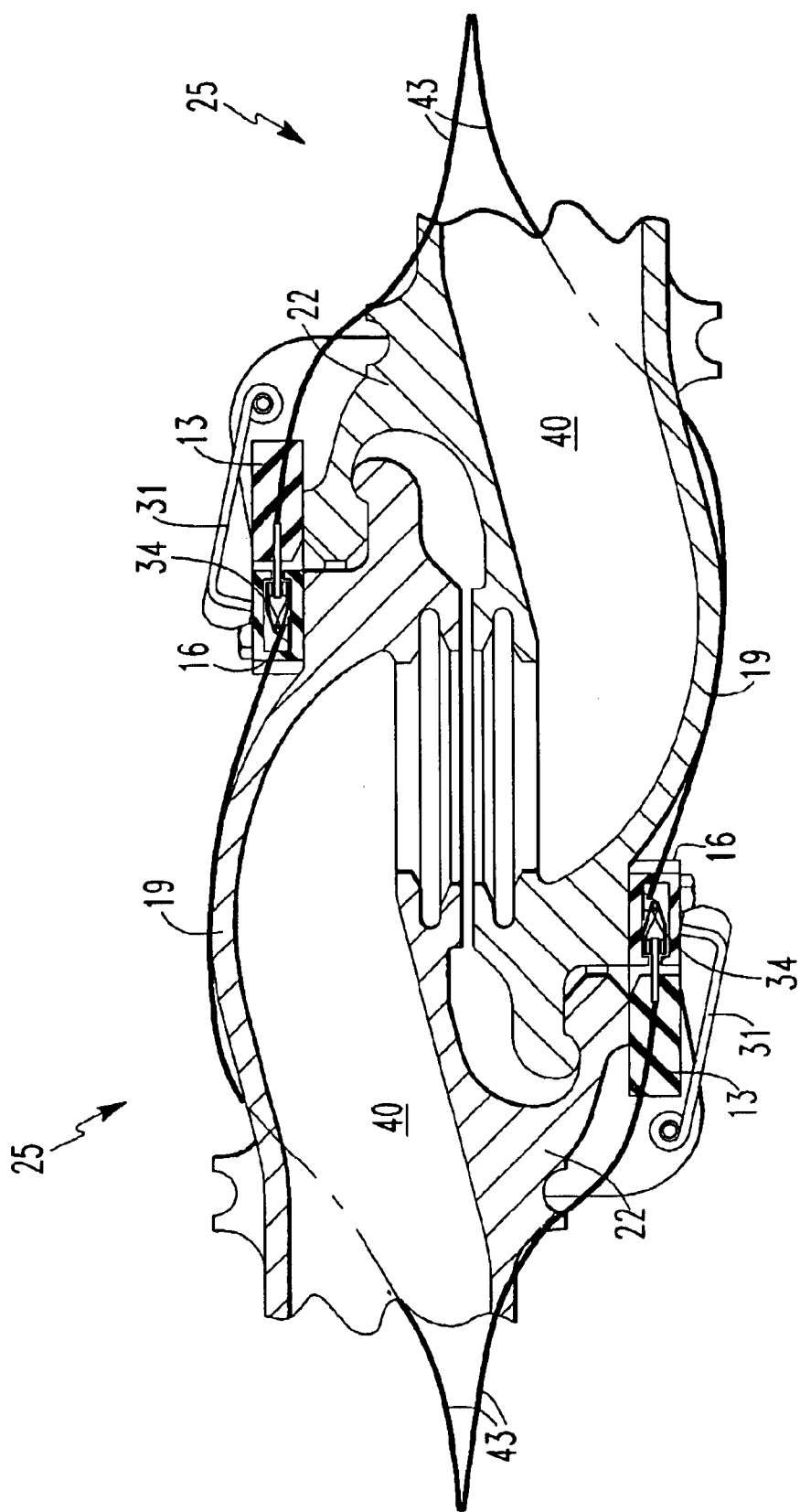
FIG. 2 is a schematic representation of the electrical connections according to the present invention.

Shown in FIG. 2 is a cross-sectional view of a pair of hose couplings 25, each equipped with the electrical coupler 10 of the present invention and designed to conduct both air 40 and electricity 43. Since the top 19 of the one hose coupling 25 is adjacent the bottom 22 of its corresponding hose coupling 25 when two cars (not shown) are coupled, each of the top mounted (fork) connectors 16 has the bottom mounted blade connector 13 of the adjacent hose coupling engaged therein. As shown in FIG. 2 an electrical conductor 43 runs from each of the contacts 13,16 towards its associated car, thus allowing for a car to car electrical connection which is easily formed using the equipped hose couplings 10 of the present invention. Preferably the two wires of the electropneumatic control brake system (not shown) do not run adjacent to each other but are kept separate, most preferably along the inside and outside of the hose 46, since this arrangement places the wires 43 on the neutral bending axis of the hose as regards the direction in which the hose must be bent to afford proper quarter turn operation of the hose couplings 25 relative to each other when they are being connected, is preferably done during coupling of the individual cars. In this way, the hose 46 does not act to stretch or break the wire when the car coupling is made. Thus, the wire 43 does not interfere with the normal action required when coupling pneumatic hoses, nor does this action disturb the wire.

Figure 3:
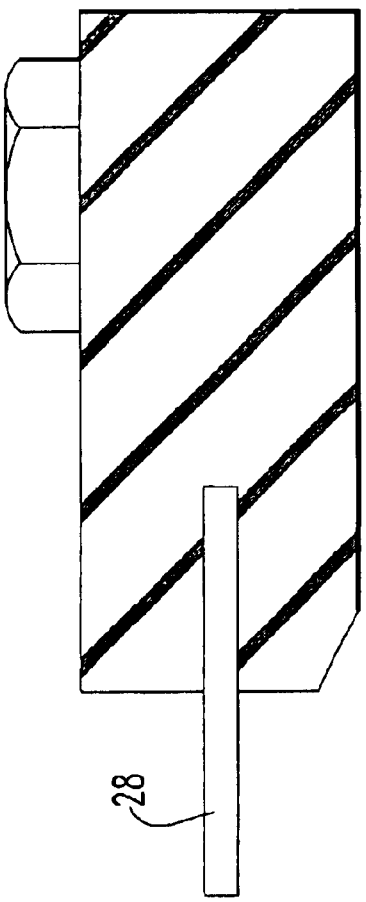
FIG. 3 is a detailed view of one embodiment of an electrical connector according to the present invention.
Figure 3:
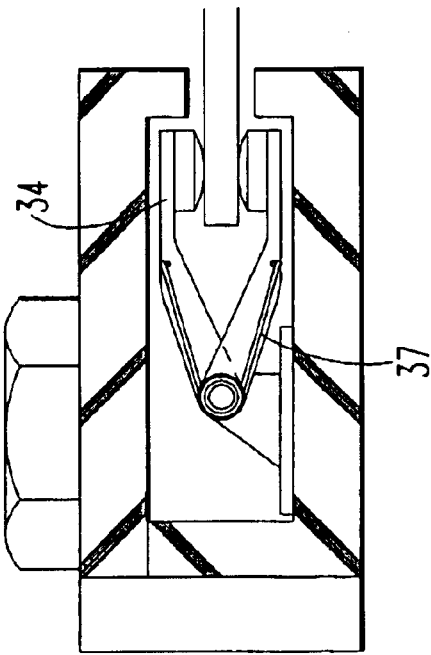
Figure 4A:
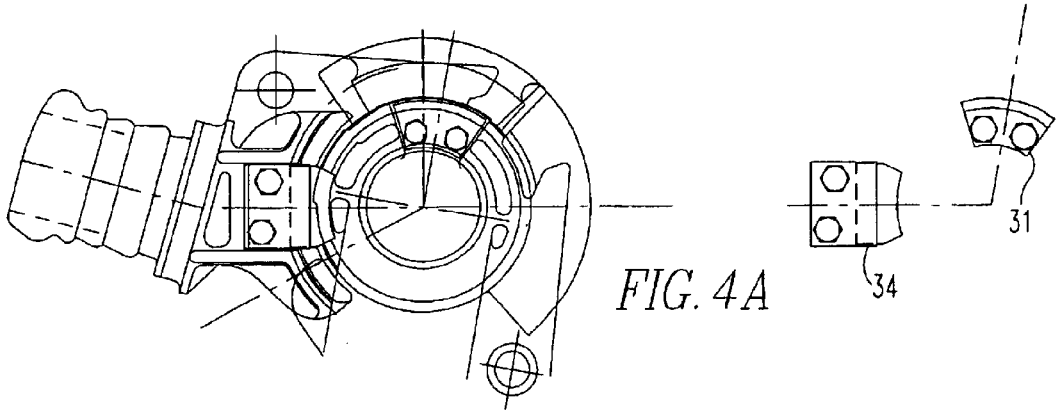
FIG. 4, consisting of FIGS. 4a–4d, show detailed steps for completing an electrical connection according to the present invention.
Figure 4B:
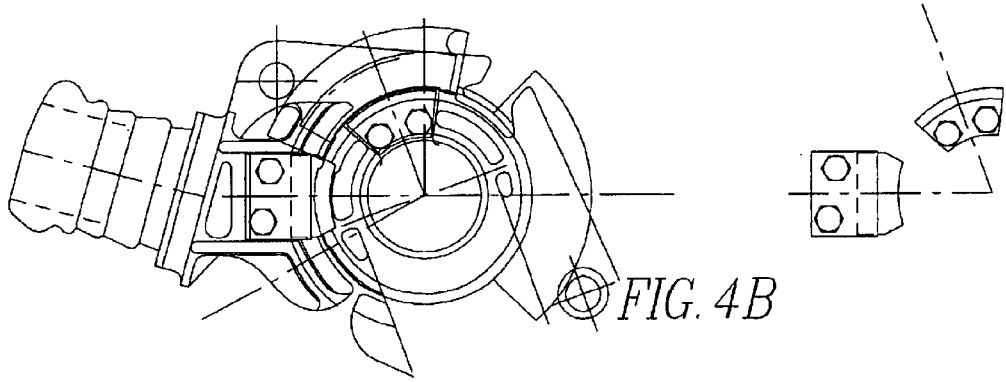
Figure 4C:
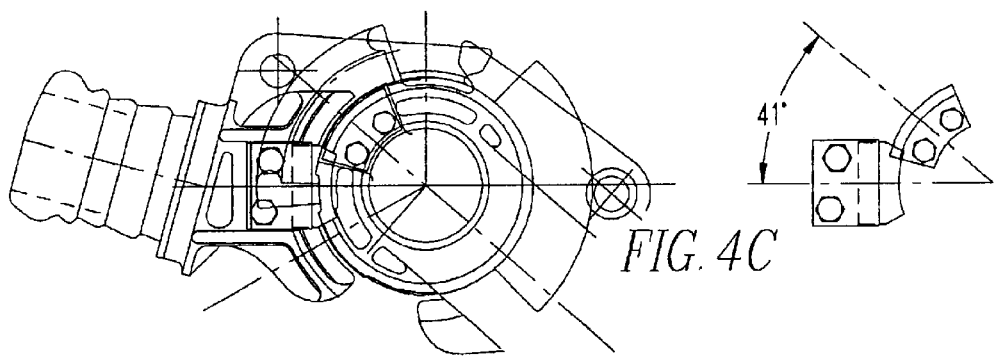
Figure 4D:
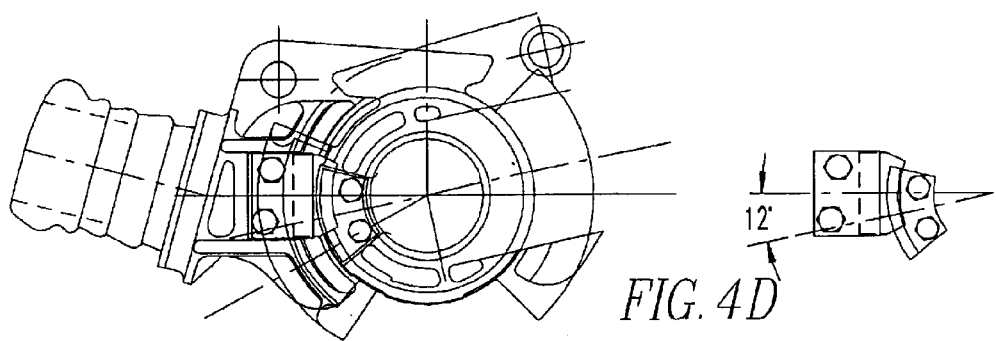

FIG. 3 shows a detailed view of a cross section of one embodiment of a configuration of connectors to illustrate the opposing contacts in the slot connector in greater detail. FIG. 3 shows that the physical dimensions of the slot 34 and blade 28 and their relative mounting dimensions do not have to be tightly constrained. The body of the slot connector 34 is so positioned such that its front is in a position behind the upper pilot radius of the hose coupling 25, assuring that any force resulting from one connector being positioned manually on the other is taken by the metal of the pilot radius rather than any part of the slot connector. Additionally, a pair of guard ribs cast into the hose coupling provide protection for the sides and top of the connector, while providing positioning and anchor services for this snap-in configuration as well.

As shown in FIG. 4, the design of the two pairs of electrical connectors is identical due to the symmetry of the coupling 10, thus the description of the make up of the one pair is applicable to the other as described herein. As shown in detail in FIGS. 4a–4d, the hose couplings 25 are first brought together manually in the usual manner, as shown in FIG. 4a. With the mating faces of the hose couplings in or close to contact, a rotating motion is applied until the trainman senses the couplings 10 beginning to engage, also as is conventional and is shown in FIG. 4b. At this point, the electrical connectors 13,16 have not been connected as they have not been placed adjacent to each other. Once the position of the coupling shown in FIG. 4b is reached, further free movement of the hose couplings independent of each other is not possible as they are physically interlocked and constrained against any movement except rotational motion about the axis of the arcuate mating faces machined into the two couplings. As the trainman continues the normal coupling operation from this position, the two couplings are rotated relative to each other through the position shown in FIG. 4c. At this point, each of the slot connectors 34 begins to lift the safety cover 31 from the blade 28 of its adjacent coupling. Rotation continues until the hoses reach their relaxed position, which is not quite to that position shown in FIG. 4d, which is the maximum travel permitted by the hose coupling's existing mechanical stop, or by the pins of the former standard hose coupling, with which the pinless design is operable.

It is to be noted that at the position when the blade 28 of the electrical connector enters the slot 34 and beyond, all movement of the couplings relative to each other is completely controlled by the geometry of the coupling and no special action is required on the part of the trainman to assure that the coupling of the train line wires has been completed. Additionally, the trainman is protected again any electrical hazard that the blade 28 might pose, because of the safety cover 31 and its automatic removal out of position to allow the coupling as the blade is rotated into position. This cover remains between the trainman's hand and the blade, even while the connectors are being coupled, so as to prevent accidental contact with the blade by either the trainman's hand or the noninsulated hose coupling body. Since the slot connector 34 has its contacts enclosed within its nonconductive housing, accidental contact with that connector is rendered virtually impossible.

As shown in the drawings, the connectors are not polarized. That is, if the wires 43 on one car were arbitrarily labeled A and B, for example, there would be no guarantee that the A wire of one car was not connected to the B wire of the other car as shown in FIG. 2. If the upper wires of both cars are labeled A and the other coupler of the right hand car has the A wire connected to the slot contact (duplicating the arrangement shown), and if the right hand car is turned end for end both slot connectors would have A wires but that of the right hand car would now be in the lower position where it would be connected with the B wire. This is not a concern in a nonpolarized AC system such as the present invention where no system polarity is required.

Thus the present invention provides for improved safety with the use of a combined coupling due to several factors: (1) a combined connector encourages use of the electropneumatic brake system and other electronically operated systems such as remote locomotive control, remote handbrake release or remote retainer operation; (2) it is more difficult for someone to tamper with the electrical connection when it is simultaneously built into the pneumatic one; (3) it is more difficult for dirt and corrosion to get onto and into the contacts of a made-up connection as opposed to an open one; and (4) the number of actions that the trainman must make when coupling cars and the number of times such actions must be taken are minimized while he is in the position between the two train cars that are being coupled. The number of incidents when train personnel are required to be in this relatively hazardous location between cars is necessarily reduced, thereby reducing the chance for accident.

Reduced operating and capital costs are also possible by use of the present invention. A combined coupling as shown herein poses less physical strain on the electrical train lines during uncouplings, which would tend to increase the useful life of these couplings. Also, the train lines use the connected air hoses as a physical support for the wires thus minimizing the chance of damage to the wires themselves and the physical strength required of the wires to withstand normal coupling/uncoupling operations. A combined connector therefore simplifies and reduces the functional requirements of the electrical coupler as compared with separate connections, which will result in reduced capital costs. Operating costs are also reduced for a combined connection of the present invention due to the reduction in man-hours required in coupling a train of individual cars and the resulting better utilization of equipment.

The reliability of the electrical connection is also improved because during coupling, the blade configuration of the present invention as shown in FIG. 1, "wipes through" the slot and contacts and will clean both the slot and the connector and the blade. That is, any residue present in the slot or on the blade is effectively pushed out of the connector rather than being trapped inside to cause either intermittent operation or high electrical resistance over time. Further, due to the design of the contacts and the leverage exerted by the hose assembly on the hose couplings during coupling makeup, a very high contact force can be used without impairing the ability of the operator to make this connection. The positioning of the connectors on the hose coupling is such that the hose couplings are already mechanically engaged before the connectors themselves are actually brought together. This guards against any misalignment between contacting parts which may exist during coupling to increase the reliability of the connection.

Overall, the electric coupling system is comprised of more than just the hose couplings arranged with the electric line connectors, but encompasses everything between the ends of the cars including the connectors, cables, fastening of the cables and connectors to the parts of the hose assembly and connection of the cables electrically to the car body wiring, as well as fastening the electrical conductors mechanically to either end of the junction box. Since the connectors themselves are not polarized, there is no need for the cables themselves to be so polarized. Accordingly, a train line wire with either a slot or blade connector molded onto one end and a single pole plug with a clamping lug molded to its other end should be capable of being changed in its entirety from the hose coupling to the junction box. Ideally, this requires few or no tools which are not otherwise easily carried by the workman in his day to day activities. Preferably, in order for the premolded cable assemblies of the present invention to work most advantageously on each car, a standard junction box location should be chosen. It is preferred that the junction box either be rigidly mounted to or cast integrally within the car angle cock body. This provides a fixed geometry for the entire hose assembly and its junctions to the car mounted pneumatic and electric systems, allowing the advantages of the interchangeable parts to be fully realized for the electrical as well as the pneumatic component of the brake system. In a preferred embodiment, the junction box includes a connector for the cable assembly which permits replacement of these assemblies by a car man in a train yard with no electrical training and minimal tools, and with no hazard to the car man whether the train electrical wiring is energized or not. One such embodiment is shown in FIG. 5.

This embodiment comprises a junction box 49 which includes four contacts, each located at the bottom of a bore in a non-conductive material, such as hard rubber or epoxy. All moving parts of the connector are housed within the plugs 52, which are replaced with the hose, thus minimizing the likelihood of connector wear-out on the car body, which might require an electrician or other specially trained personnel to maintain. Each plug is sealed by an O-ring 55 when inserted to thereby make the box 49 water tight. The plug design is such that it is well out of connection with any system voltage before being withdrawn to a point where personnel could touch it. The box includes a retainer plate which clamps all the plugs in place, which preferably is carried on a captive bolt 58 to prevent loss of parts, which bolt requires a special wrench. The only other tool needed to make the couplings would be the standard air hose wrench already required for maintenance of the connector system.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. An electropneumatic train line connector for connecting a train pneumatic brake pipe and an electrical line, the connector comprising:

a brake pipe angle cock, the angle cock having a first end mounted on a rail vehicle at one end of the brake pipe, the angle cock having a second end into which a hose assembly is connected, the hose assembly includes a hose coupling with an inner face and an outer face;

a first electrical connector mounted on the inner face and a second electrical connector mounted on the outer face; and wherein the first electrical connector further comprises an electrically conductive blade and the second electrical connector further comprises at least one electrically conductive contact means, such that the electrically conductive blade of a first hose coupling completes a first electrical connection with the electrically conductive contact means of a second hose coupling and the electrically conductive blade of the second hose coupling completes a second electrical connection with the electrically conductive contact means of the first hose coupling when the pneumatic connection is completed.

2. The electropneumatic train line connector as recited in claim 1, wherein the first electrical connector further includes a cover, such that the cover is removed and the electrically conductive blade is exposed as the second electrical connector is moved to complete the electrical connection.

* * * * *

UNITED STATES PATENT AND TRADEMARK OFFICE
CERTIFICATE OF CORRECTION

PATENT NO. : 6,705,478 B1  Page 1 of 1
DATED : March 16, 2004
INVENTOR(S) : Thomas H. Engle It is certified that error appears in the above-identified patent and that said Letters Patent is hereby corrected as shown below:

<u>Title page,</u>
Item [75], Inventor, please change "Thomas L. Engle" to -- Thomas H. Engle --.

Signed and Sealed this

Twenty-fifth Day of May, 2004

JON W. DUDAS
*Acting Director of the United States Patent and Trademark Office*